May 31, 1960

J. J. ALVES 2,938,427

PHOTOCOPYING APPARATUS

Filed June 13, 1955

Inventor
John J. Alves
by Roberts, Cushman + Grover
Att'ys

Inventor
John J. Alves

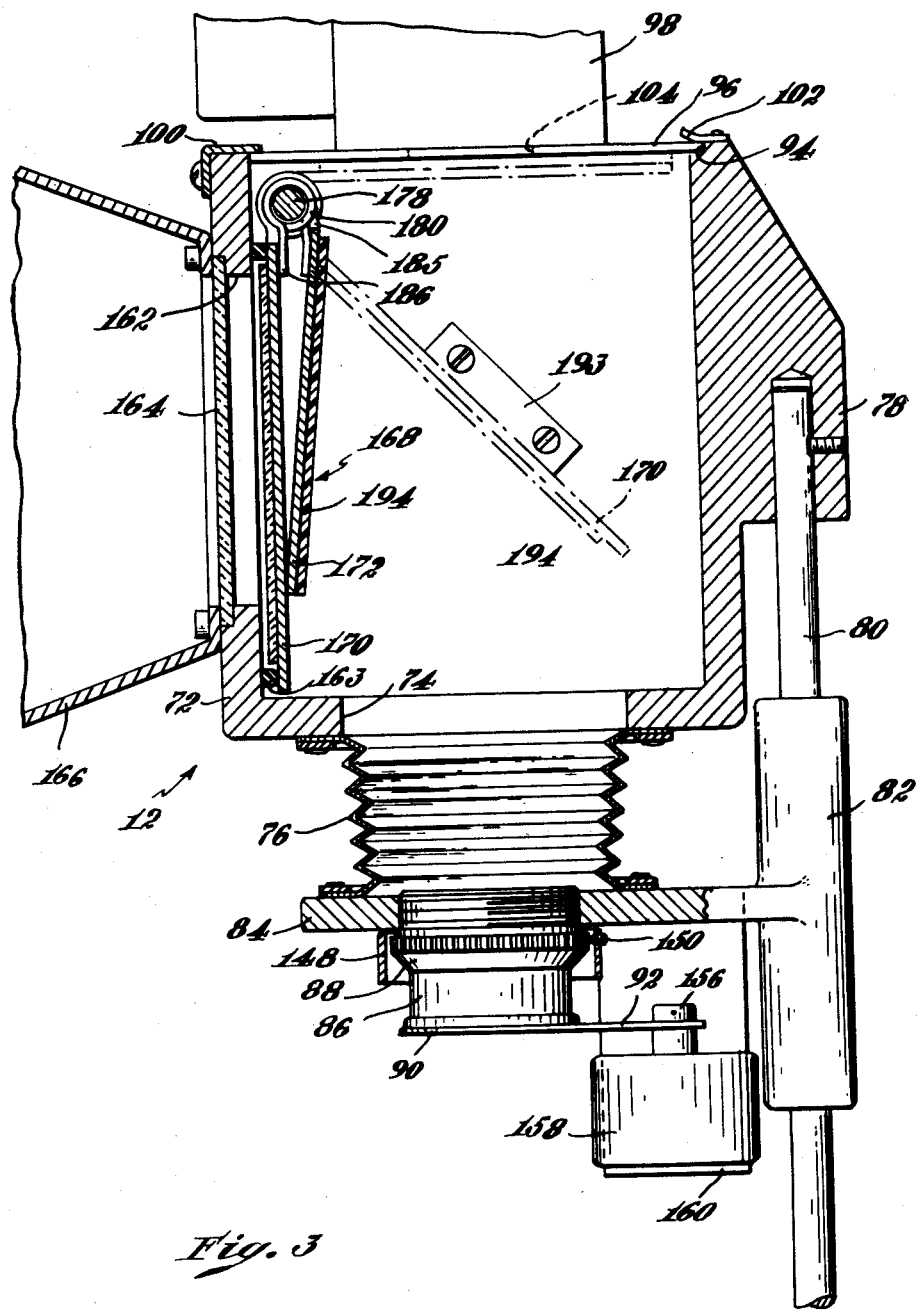

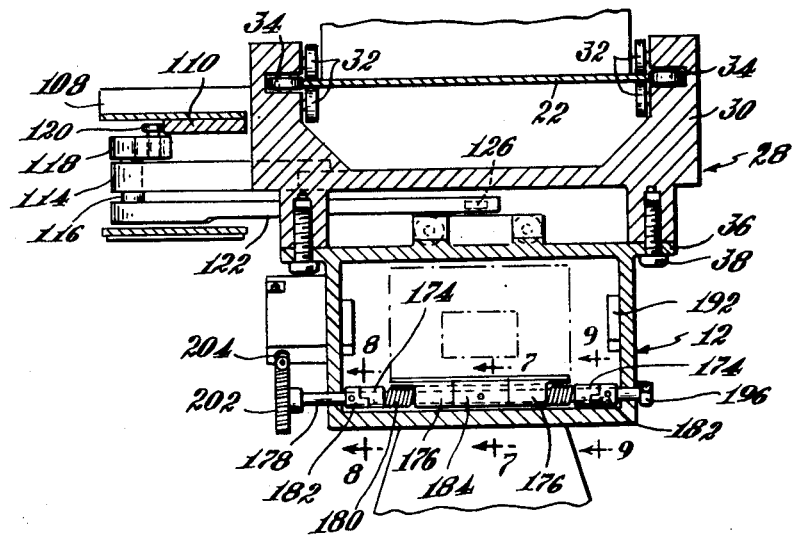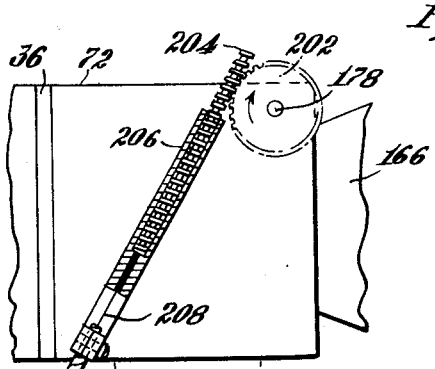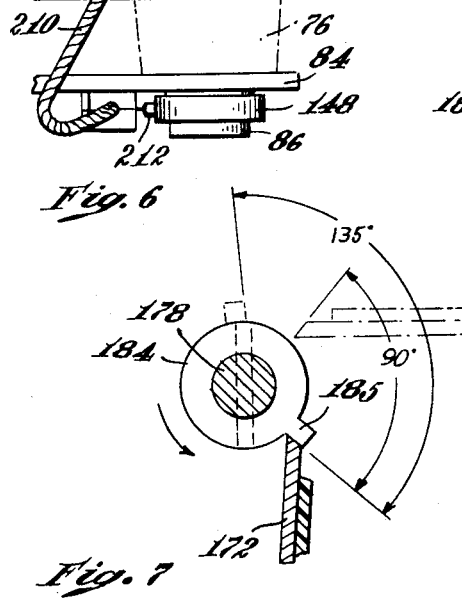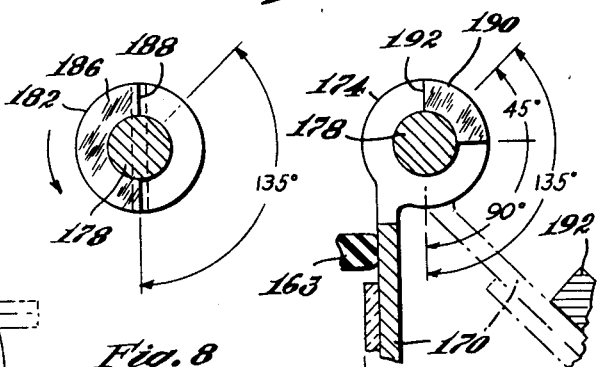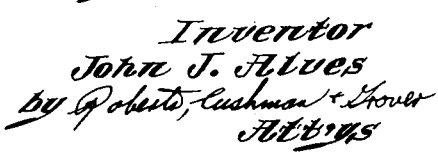

Inventor
John J. Alves

United States Patent Office 2,938,427
Patented May 31, 1960

2,938,427

PHOTOCOPYING APPARATUS

John J. Alves, Braintree, Mass., assignor to Alves Photo Service, Inc., Braintree, Mass., a corporation of Massachusetts Filed June 13, 1955, Ser. No. 514,869

3 Claims. (Cl. 88—24)

This invention relates to apparatus for photographically reproducing prints or their equivalent where the negative has been lost or there is no negative in its original production and has for its principal objects to provide apparatus for reproducing copies of one size from many different size originals rapidly, accurately and in sharp focus with good definition without requiring exacting manipulation and/or critical visual judgement on the part of the operator, which provides for making a plurality of the same or different copies of the same size on a continuous film, which provides for interchanging films of different size so that copies of different size can be made either continuously or alternately first on one film and then on the other and which optionally provides for viewing the original after focusing and prior to printing to permit cropping when desired without danger of light leaks. Other objects are to provide an apparatus in which the original may be accurately aligned with the lens, in which a substantially constant light source is maintained at all times, in which a unidirectional light source is available and which is comparatively simple in construction, easy to operate, efficient and durable.

In accordance with the foregoing objects a camera is mounted for linear movement relative to a support for receiving an original or print which is to be photocopied. The support has several interchangeable masks of different size for receiving prints according to their size and the camera is movable perpendicularly to the masked print resting on the support to reproduce the print on one or the other of two films of different size. The camera has at one end a lens connected to it by a bellows, a diaphragm and shutter and at its opposite end a film aperture over which is disposed a length of unexposed film. A detachable film magazine is fastened over the aperture and carries spaced reels, from one of which the unexposed film is unwound and onto the other of which exposed film is taken up and mechanism for driving the take-up reel. The camera is preferably supported vertically above the support and is vertically slidable along a track arranged perpendicular to the support. A counterweight is attached to the camera in a fashion to neutralize its weight so that it can be moved easily and will remain in substantial equilibrium at any given position. A rack and pinion carried by the camera and track are operably associated to raise and lower the camera with respect to the support. A locking device provides for fixing the camera at a predetermined heightwise setting so that it cannot be accidentally joggled out of position. A cam is fixed to the track adjacent the path of travel of the camera and there is means mounted on the camera and operable by the cam to effect automatic focusing of the lens as the camera is elevated and/or lowered in accordance with the size of the print on the support. There is also a cam fixed to the camera and means connected to the diaphragm which is operable by the cam during automatic focusing movement of the lens automatically to change the diaphragm opening the proper amount. The camera box has in it a front opening in which is located a ground glass on which may be seen the print resting on the supporting surface by way of the camera lens thus to permit viewing the print and also to permit cropping if desired. A closure is mounted adjacent the opening which is operable in one position to close the opening and in another position to close the film aperture. The closure has parts which operate successively to close the film aperture prior to uncovering the ground glass and vice versa and one of the parts carries a reflector by which the image on the lens is transferred to the ground glass when the latter is uncovered. There is other means associated with the closure operable automatically to distend the diaphragm to its maximum opening when the closure is moved to its open position independently of the means for automatically distending the diaphragm during focusing and to swing the shutter to its open position. Illuminating means in the form of lamps are arranged between the camera and the support for projecting light downwardly at a high angle of incidence onto the surface of the print on the support and there is means for screening out the non-parallel rays and other means for increasing the current supply to the lamp filaments as they age to maintain a constant amount of light.

The invention will now be described in greater detail with reference to the accompanying drawings wherein:

Fig. 3 is a side elevation of the camera in vertical section to very much larger scale;

Fig. 4 is a horizontal section taken on the line 4—4 of Fig. 1;

Fig. 5 is a horizontal section taken on the line 5—5 of Fig. 1;

Fig. 6 is a side elevation as seen from the left side of Fig. 1 to larger scale showing the mechanism for operating the diaphragm;

Figs. 7, 8 and 9 show various positions of the mechanism for operating the closure for the viewing screen;

Figure 1:
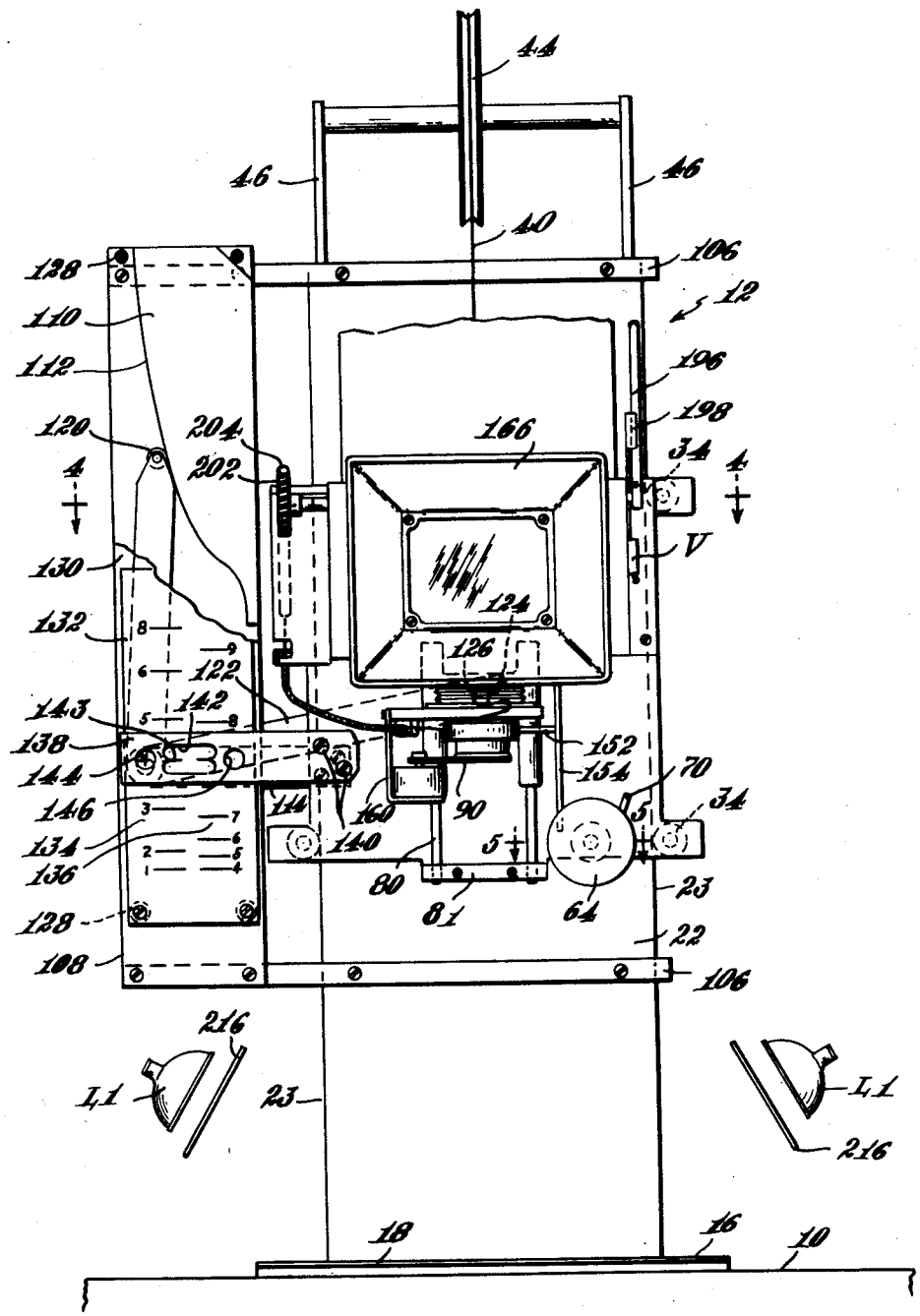
Fig. 1 is a front elevation of the apparatus with the housing omitted to more clearly show the operating parts.
Figure 2:
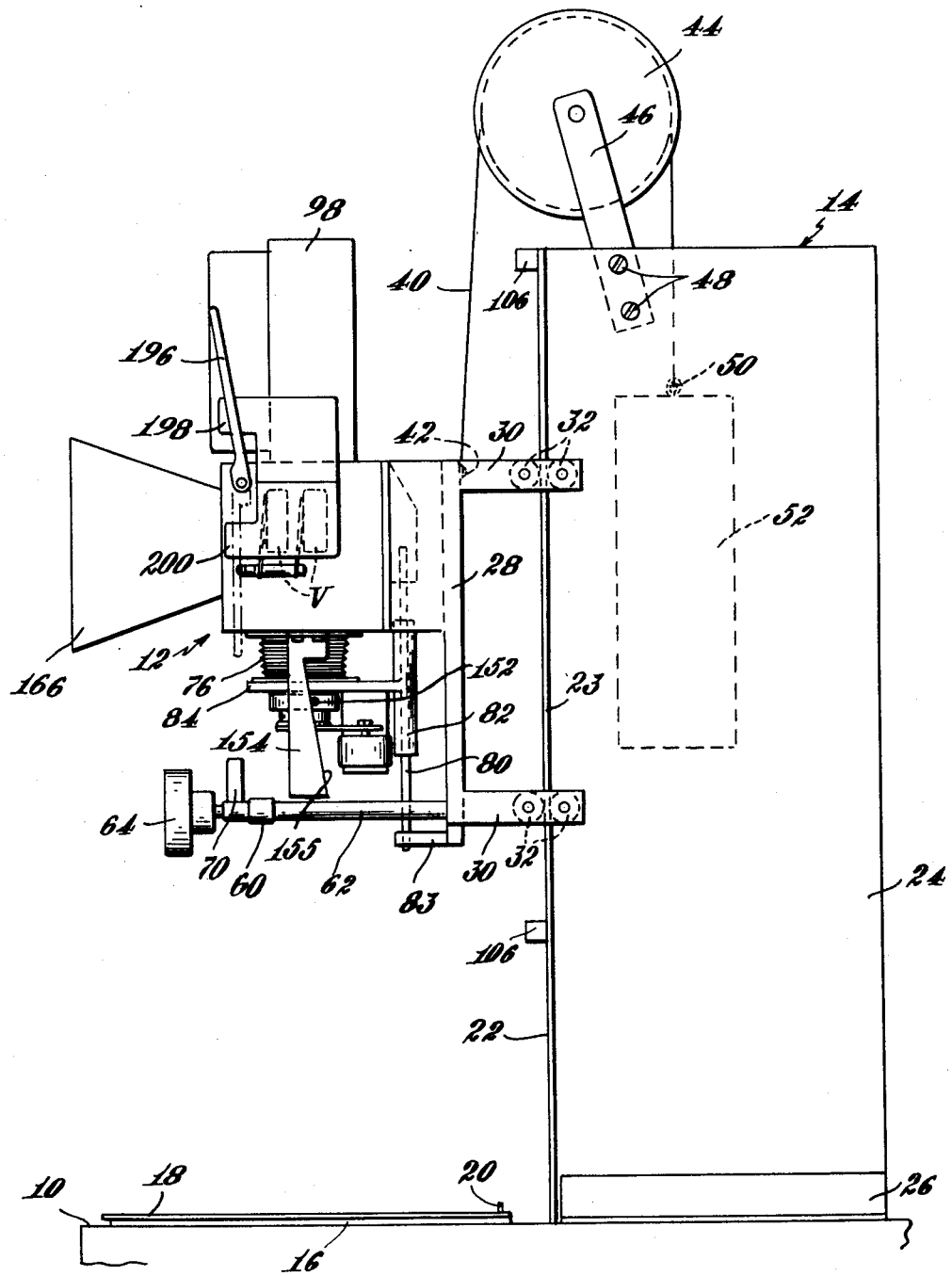
Fig. 2 is a side elevation of the apparatus as seen from the right-hand side of Fig. 1.

Referring to the drawings (Figs. 1 and 2) the apparatus has a hollow base 10 above which is mounted a camera 12 which is suspended for vertical movement relative to the base on a frame 14 rising vertically from the base. A platen 16 is fastened to the base so as to be vertically subjacent to the camera and has mounted on it one of a plurality of masking plates furnished for different size prints, shown at 18. The rear edge of each plate has near its corners apertures through which project posts 20 rising from the rear corners of the platen for holding the mask in position without danger of skew and at the same time permitting elevation of the forward edge of the mask to allow the operator to insert a print beneath it in a proper position for photocopying.

Figure 11:
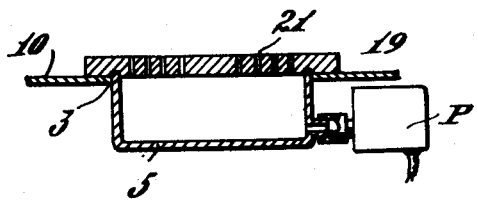
Fig. 11 is a vertical section through the platen showing the vacuum chamber.
Figure 10:
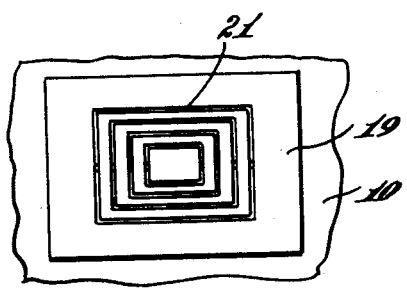
Fig. 10 is a plan view of an alternative form of platen.

If desired the masking plate may be replaced by a single plate 19 (Figs. 10 and 11) which has on it a series of concentric rectangles corresponding in size to different size prints. Along each side of each rectangle are narrow slots or perforations 21. The plate covers an opening 3 in the platen at the top of the base 10, below which is a hollow chamber 5 and this is evacuated by a pump P so that suction is provided which will hold a print placed on the plate in place without need for a mask.

The frame 14 has a vertical front plate 22 and rearwardly extending, spaced parallel walls 24 which are connected to each other and to the base by angle pieces 26. The front plate 22 is welded to the edges of the side walls with its opposite edges projecting appreciably beyond them thus providing at its vertical edges spaced, vertically extending tracks 23—23.

A carriage 28 has rearwardly extending, vertically spaced pairs of spaced legs 30—30. The inner side of each leg 30 (Figs. 2 and 4) has rotatably mounted on it a pair of spaced rollers 32—32 adapted, as shown in Fig. 4, to engage the front and rear surfaces of the tracks 23. Each leg also has a recess in which is mounted a roller 34 rotatable on an axis at right angles to the axes of the rolls 32—32 for engagement with the edge of the track 23. Thus the carriage is constrained to move vertically without danger of displacement forwardly or rearwardly or sidewise with respect to the platen beneath it. The camera 12 has on its rear side laterally extending flanges 36 (Fig. 4) through which bolts 38 are inserted and screwed into threaded openings in the carriage. The carriage with the camera attached thereto is suspended by a flexible cord 40 (Figs. 1 and 2), one end of which is attached at 42 to the upper end of the carriage, which passes upwardly therefrom over a pulley 44 rotatably mounted between a pair of bracket arms 46 fastened by screws 48 to the frame 14 and downwardly therefrom to an eye 50 at the top of a weight 52. The weight 52 is of such size as to be substantially equal to the weight of the carriage and camera thus to nearly counterbalance the latter and hence so to facilitate elevating and lowering of the same.

For the purpose of elevating and lowering the camera there is provided, as shown in Fig. 5, a vertically positioned rack bar 54 having teeth along one side, which is fastened to the front plate 22. A spindle 56 is journaled in one of the legs 30 of the carriage with one end extending rearwardly therefrom adjacent the rack bar and has fast to it a pinion 58 which meshes with the teeth of the rack bar 54. Rotation of the spindle 56 will thus cause the pinion to travel upwardly or downwardly along the rack bar and in accompaniment therewith the carriage. The forwardly extending portion of the spindle 56 is supported by a bearing block 60, the latter in turn being rigidly fastened forwardly of the leg 30 by a pair of screw threaded studs 62. A knob 64 fastened to the spindle 56 provides means for rotating it. It is desirable to lock the carriage in a selected position so as to prevent and possible chance of accidental movement. Accordingly, a threaded spindle 66 is mounted in the leg 30 which has at its rear end a stake 68 adapted by longitudinal movement of the spindle to be brought up hard against the plate 22. The forward end of the spindle is journaled in the block 60 and has a knob 70 on it which provides for rotating the spindle to force the stake against the plate 22, hence to lock the carriage in place.

The camera has a light box 72 (Fig. 3) in the lower side of which is an opening 74 over which is fastened one end of a bellows 76. The rear side of the box has a boss 78 containing spaced vertical bores in which are seated and secured by means of set screws the upper ends of a pair of spaced parallel rods 80—80. The lower ends of these rods are fastened to a bar 81 (Fig. 1) which in turn is fastened by rearwardly extending legs 83 (Fig. 2) to the carriage. A pair of sleeves 82—82 are slidably mounted on the rods 80—80. A web connecting the sleeve projects forwardly from them in the form of a horizontal arm 84 to which the lower end of the bellows 76 is fastened so as to be concentric with a threaded opening therein in which is screwed a lens barrel 86 which contains a lens (not shown) and a diaphragm (also not shown). A knurled collar 88 on the lens barrel of convention construction provides means for distending and contracting the diaphragm. Beneath the lens barrel and in contact with its lower end is a shutter 90 which is carried by an arm 92 for movement from a covering to an uncovering position as will be described hereinafter.

The upper end of the camera box has an opening 94 around which is a shoulder adapted to receive the flange 96 of a film magazine 98. The magazine is of conventional construction and contains a pair of spaced reels, on one of which is mounted a coil of unexposed films and the other of which is adapted to take up the exposed film after exposure. The take up reel is driven intermittently by a suitable motor actuated in timed relation with the shutter 90 to dispose an unexposed length of film across an aperture 104 just before the shutter is swung open. The magazine is detachably fastened to the camera box to permit removal for loading or change of film size by a fixed bar 100 fastened along one side of the opening 94 so as to overhang it and a pair of pivoted fingers 102 fastened along the opposite edge which may be swung over the flange 96 to secure it in place or swung out of contact with the flange to permit the magazine to be removed.

It is desirable automatically to focus the camera as it is elevated or lowered with respect to the platen. Accordingly, vertically spaced bars 106 (Fig. 1) are fastened to the plate 22 with end portions projecting laterally of the camera and between these end portions is fastened a plate 108. A cam plate 110 is fastened to the forward face of the plate 108 which has a curved cam track 112. A bar 114 is bolted to the carriage so as to project laterally therefrom parallel to the plate 108 and at the outer end of this bar there is journaled a shaft 116, to the rear end of which is fixed an arm 118 carrying at its extremity a roller 120 which bears against the cam track 112. The forward end of the shaft 116 has fastened to it an arm 122 which extends laterally between the back of the carriage and the frame and has at its free end a notch 124 which embraces a pin 126 projecting rearwardly from the web connecting the sleeve 82—82. As thus constructed angular movement of the arm 122 will elevate or lower the arm 84 and hence change the focus of the lens and angular movement of the arm is, of course, controlled by movement of the cam roll 120 along the cam track 112. The cam track 112 is so designed as to provide the proper focus for the lens used at whatever height it is placed above the platen. Four posts 128 are fastened to the plate 108 and project forwardly therefrom for supporting a second plate 130 parallel to the plate 108 and on this plate there is a scale card 132 which bears spaced vertical scales 134 and 136 inscribed with indicia representing the proper elevation of the camera for a masking plate of given size depending upon whether photocopying is to be carried out on a 35 millimeter film or a 70 millimeter film. An arm 138 is fastened by screws 140 to the camera carriage and projects laterally over the scale card. This arm has in it a central aperture 142, at the opposite ends of which are inwardly facing pointers 143 which may be brought into accurate registration with the scale markings by rotation of the knob 64 so as to accurately set the camera at its proper elevation above a given mask for either 35 millimeter film photoprinting or a 70 millimeter film photoprinting. Opposite the ends of the aperture 142 are apertures 144 and 146 through which the scale markings may be seen easily as the camera is elevated and lowered with reference to the scales.

A ring or collar 148 (Fig. 3) is mounted on the lens barrel 86 around the ring 88 and is fixed with reference thereto by a set screw 150. The collar 148 carries a radial extending pin 152 (Figs. 1 and 3) which is adapted to bear against a cam plate 154 (Fig. 2) fastened to the camera box substantially parallel to the path of movement of the lens and has a rear inclined edge 155 designed to automatically open and close the diaphragm by rotation thereof suitable amounts depending upon the light required for any given vertical distance of the lens with respect to the platen.

The arm 92 of the shutter 90 is fastened to a shaft 156 extending from a rotary type solenoid 158 which when actuated by supplying current thereto will swing the shutter away from the lens so as to expose the film. The solenoid is mounted on a bracket 160 fastened to the arm 84.

The camera box 72 (Fig. 3) has a front opening 162 in which there is seated a screen 164, for example, a ground glass which the operator may, as will subsequently appear, see an image of the object resting on the support through the camera lens. The plate is secured in place by the inner end of a visor 166 screwed to the front of the camera over the opening and the edges of the glass seated therein. The glass may be of the ground variety or have a treated surface for receiving the image. A closure 168 is provided for covering the opening 162 while photographing a print, which closure is designed to be swung open at will, first to close the aperture 104 so that no light can get to the film and then after completely closing this aperture uncovering the opening 162. The closure has two swingable parts or leaves 170 and 172, the former having widely spaced bearing sleeves 174—174 along one edge and the latter more closely spaced bearing sleeves 176—176, whereby the parts are pivotally mounted on a horizontal shaft 178, the ends of which are journaled in the walls of the camera box. On the shaft 178 there is mounted between each of the bearing sleeves 174 and 176 a coiled spring 180. Outwardly of each bearing sleeve 174 there is mounted on the shaft and fixed thereto a collar 182 and between the sleeve bearings 176—176 there is mounted a collar 184 which is also fixed to the shaft. The collars 182 have axially extending semicircular lugs 186 (Fig. 8) having diametrical surfaces 188. The bearing sleeves 174 have axially extending quarter circular lugs 190 having radial bearing surfaces 192 which extend toward and interlock with the semicircular lugs 186 on the collars 182. The springs 180 (Fig. 3) are under compression and have ends 186 located between the parts 170 and 172 which normally tend to spread them apart to substantially right angular positions so that the part 172 which carries a felt pad 194 will yieldably be pressed against the aperture 104 while the part 170 occupies a position covering the opening 162 and in this position bears against a rubber gasket 163 bounding the opening 162. Normally when the camera is being used the part 172 is held against the rear side of the part 170 in an out-of-the-way position so as not to interfere with projection of the image from the lens onto the film by contact of a radially extending lug 185 on the collar 184, with the rear edge of the part 172 as shown in Fig. 7. At this position of the lug the diametrical surfaces 188 are located in vertical positions (Fig. 7) and the quarter circular lugs are in the position shown in Fig. 9. By rotating the shaft in a counterclockwise direction, as seen in Fig. 8, the lug 185 is caused to travel counterclockwise and thus allow the springs to swing the part 172 in a counterclockwise direction as seen in Fig. 7. By turning the shaft 178 through an angle of 90° the part 172 is allowed to swing upwardly to a substantially horizontal position to cover the aperture 104. At this position since there is still tension in the springs 180 both the parts 172 and 170 are held firmly over their respective openings. Also at this position the lower part of the diametrical surfaces 188 of the lugs 186 are in contact with the lower surfaces 192 of the lugs 190. Further counterclockwise rotation of the shaft 178 will therefore commence to rotate the bearing sleeves 174 and hence to swing the part 170 in a counterclockwise direction upwardly to a position in contact with a pair of angularly positioned stops 193 (Fig. 3) fastened to the walls of the camera box. The stops are located at substantially 45° with respect to the plane of the screen 164 so that when the part 170 is brought up against it, it will occupy a position substantially 45° from the plane of the screen 164. A reflector 194 in the form of a mirror is fastened to the part 170 so that at this 45° position an image from the lens is reflected on the surface of the screen 164 and may be observed by the operator. The shaft 178 is turned by an arm 196 fastened to a portion of it projecting from the camera and is held in an elevated position by a spring finger 198 (Fig. 2) and in a depressed position by a spring finger 200. Movement of the arm to turn the shaft in a clockwise direction to restore the part 170 to its initial position results in movement of the part 170 from its 45° position to its vertical position without affecting the part 172 which is held over the aperture 104 by the spring tension of the springs 180. Final movement of the arm 196 to its up position, however, brings the lug 185 into contact with the rear edge of the part 172 so as to produce clockwise rotation of the part 172 in opposition to the springs 180 until it is restored to its initial position against the rear side of the part 170.

When the closure 168 is swung to an open position to obtain an image on the screen 164 it is desirable to open the diaphragm to its maximum extent to admit a maximum amount of light and also to swing the shutter 90 open. Accordingly, there is fastened to the shaft 178 at its end opposite the handle 196 a worm gear 202 (Fig. 6) which meshes with a worm 204 journaled in a sleeve 206 fastened to the side of the camera. The worm 204 has fastened to an end of it a Bowden wire 208 which extends through a flexible sleeve 210 to the lens barrel where it is connected to the ring 88 in a fashion to effect rotation of it. Accordingly, when the closure 168 is swung to uncover the screen the Bowden wire is actuated to open the diaphragm to its maximum opening. Simultaneously, a switch V (which will be described hereinafter) effects operation of the solenoid 158 which when energized swings the shutter 90 to an open position. When the closure is restored to its closing position the reverse action takes place so that the diaphragm is restored to its original position and the shutter 90 is closed.

Figure 12:
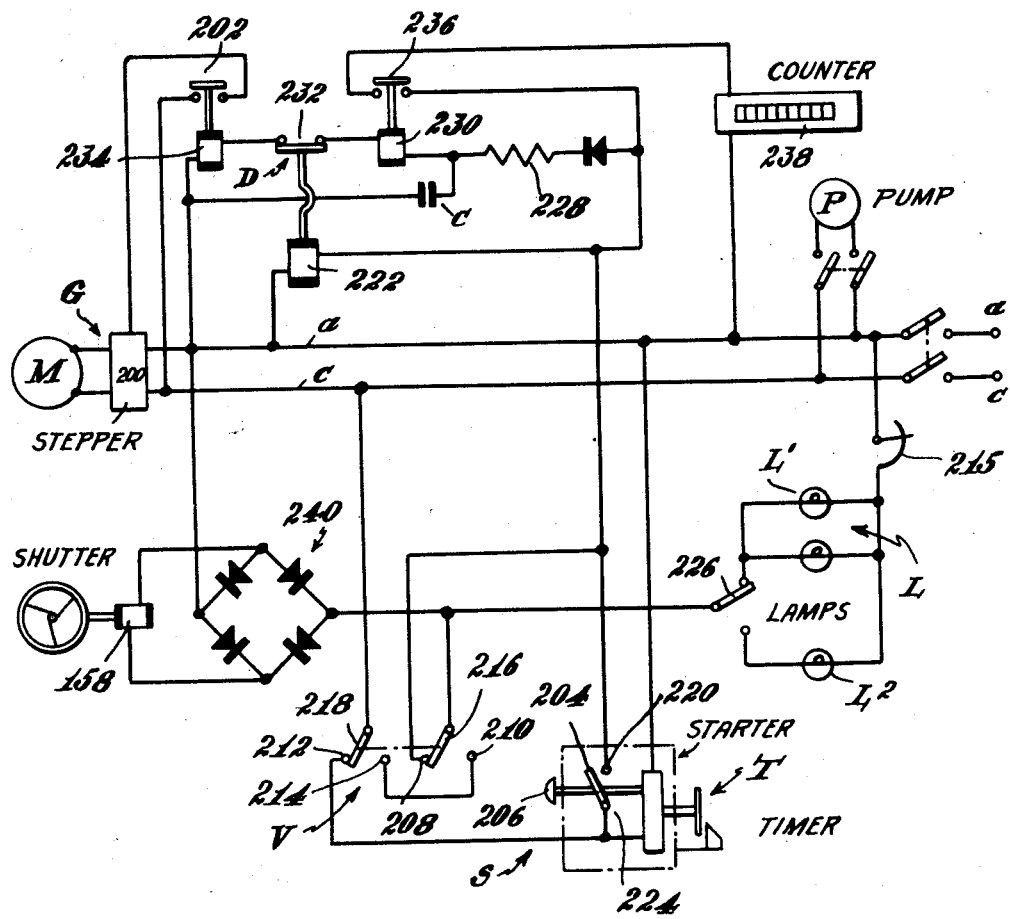
Fig. 12 is a wiring diagram for the apparatus.

At opposite sides of the platen, below the camera, there are mounted lamps L1 arranged to project light at a high angle of incidence on the surface of the platen. The filaments of these lamps age with use so that from day to day they project less and less light for a given input. Accordingly, the lamp circuit is provided with a rheostat 215 (Fig. 12) by which the amount of current supplied to the lamp is increased as needed to compensate for its loss of light emission. This loss and compensation is determined and rectified by placing a standard light meter on the support at the beginning of each day and then manipulating the rheostat until sufficient current is supplied to produce the required light emissivity from a white card laid on the platen.

For copying transparencies lamps L2 are mounted below the platen in the base of the support so as to direct the light upwardly through a transparency placed on the platen.

It is also desirable to eliminate in so far as possible extraneous light which causes undesirable reflections. Accordingly, polarizing means in the form of screens 216 are placed between each lamp and the support to cut out all rays except those parallel to the direction of projection.

The film magazine 98 holds approximately 100 feet of unperforated film. For those plants which are not set up to process the entire length of film a film notcher (not shown) is mounted on the magazine to mark the film when a length has been exposed which is suitable for the particular equipment available. Thus after the film has been entirely exposed it may be removed from the magazine in the dark room and cut up into suitable lengths for processing at the places where the notches have been made.

The above described optical and mechanical components of the device according to the invention are electrically correlated as follows.

A conventional alternating current supply line, indicated at $a$, $c$ supplies the pump P and the stepping means G. These include a motor M which is controlled by means of a stepper device 200 which, upon receiving an alternating current impulse due to closure of a stepper switch 202 in the manner to be described below, energizes the motor to advance the film one frame and then again stops it. Devices of this type are conventional and therefore do not require detailed description.

A starter circuit S comprises a normally open starter switch 204 which is manually operated by means of push button 206 and, upon such closing operation starts a timer device indicated at T. The circuit S further includes a double pole double throw changeover switch V with four fixed contacts 208, 210, 212 and 214 and two movable contacts 216 and 218. It will be understood that this switch can assume any conventional construction, for example it can be a pair of single pole double throw microswitches. The contact 220 of starter switch 204 is connected to contact 208 and to the control switch actuating solenoid 222 to be further described below. The other contact 224 of the starter switch 204 is connected to the timing device T and to the contact 212 of changeover switch V. The timer T is thus connected to both wires of the A.-C. line $a$. The movable contact 218 of the changeover switch V is connected to the A.-C. line $c$, and movable contacts 216 lead to switch 226 of the lamp circuit L which comprises, as described above, groups of lamps L1 and L2. These light sources can be used interchangeably by means of the switch 226 which is shown in the diagram to energize the lamp group L1. The contacts 210 and 214 are connected by a jumper. Contact 208 leads to contact 220 of switch 204 and to the above mentioned solenoid 222.

A D.-C. control circuit D includes a conventional single wave rectifier 228 in series with a direct current solenoid 230 of a counter relay, a normally closed control switch 232, and the direct current solenoid 234 of a stepper actuating relay. The normally closed control switch 232 is operated by the above mentioned alternating current solenoid 222. The direct current solenoids 234 and 230 operate the normally open stepper switch 202 and the normally open counter switch 236.

A capacitor C is connected in parallel to solenoids 234 and 230 and control switch 232 so that, if switch 232 is closed and switch 204 is open the capacitor is connected in series to solenoids 234 and 230. Switch 202 energizes the above mentioned alternating current stepper 200, and switch 236 similarly energizes an alternating current counter 238.

A conventional single wave rectifier 240 is supplied with alternating current from line $a$, $c$ through switches 208, 204, and 212, and feeds direct current to the shutter solenoid 158.

The above described circuit operates as follows.

When starter button 206 is pressed, a circuit $a$—222—204—212—$c$ is established and the alternating current relay 222 is energized and opens switch 232 to maintain solenoids 234 and 230 de-energized and switches 202 and 236 open. The timer T begins to run. The half wave rectifier circuit D is energized in $$a\text{—}C\text{—}228\text{—}204\text{—}212\text{—}c$$

and the capacitor C charges. The ful wave rectifier 240 is energized in the circuit $a$—240—208—204—212—$c$ and the D.-C. solenoid 158 for the shutter is energized. The lamp circuit L is supplied in circuit $$a\text{—}L\text{—}226\text{—}208\text{—}204\text{—}212\text{—}c$$

The timer T having been set for a given period of exposure time as above described, now opens the starter switch 204. The control switch solenoid 222 is de-energized and recloses the switch 232. The capacitor C then discharges in the circuit C—234—232—230—C and the relays 234 and 230 are energized. The switch 202 thereupon closes and actuates the stepper 200 to advance the magazine motor M one frame. The switch 236 energizes the counter 238. Upon the discharge of the capacitor C the circuit is restored to normal and ready for the next cycle to be started by pressing button 206.

If it is desired to use the reflex viewer, the movable contacts 218 and 216 of changeover switch V are transferred from 208 and 212 to 210 and 214 respectively, and the starter switch 204 is thus disconnected from the source at open contacts 208 and 212. The full wave rectifier 240 is energized in circuit $$a\text{—}240\text{—}216\text{—}210\text{—}214\text{—}218\text{—}c$$

the shutter solenoid 158 is energized by 240 and the lamp circuit L is energized in circuit $$a\text{—}L\text{—}226\text{—}216\text{—}210\text{—}214\text{—}218\text{—}c$$

All these circuits are kept energized so long as the movable contacts 216 and 218 of changeover switch V are in the above described position at contacts 210 and 214.

In operation of the machine a photograph print or other original intended to be photocopied is placed by the operator beneath the mask in a frame corresponding in size to it. The frame size is numbered and depending upon whether the photocopy is to be on a 35 millimeter film or a 70 millimeter film the knob 64 is turned to bring the aperture 144 or 146 opposite the corresponding number on the left or right-hand scale and is finally adjusted by bringing the pointed marker at the end of the aperture 142 into registration with the graduation mark opposite the figure. Movement of the camera in elevation to its proper position for a given print automatically effects focusing of the lens by means of the cam 110 and arms 118 and 122 to extend or contract the bellows 76 so as to move the lens the correct amount. The switch 206 is now closed and the exposure will be made in accordance with the sequence of electrical events described above.

In the event that the operator wishes to examine the print prior to the photocopying operation, for example to effect cropping to eliminate undesirable areas before pressing the operating switch, he will swing the handle 196 downwardly and engage it behind the spring clip 200. This first swings the part 172 upwardly to cover the aperture 104 thereby to seal it before the part 170 is swung away from the opening 162 and then swings the part 170 away from the openings into engagement with the stops 192 thus placing the mirror at 45° to the axis of the lens. This is accompanied by automatic opening of the diaphragm and through the switch V located near the handle 196 so as to be actuated by it as its downward movement is completed to energize the solenoid 158 and the lamp circuit thereby to swing the shutter open and energize the lamps so that a clear image of the object on the support is projected onto the screen 164 for examination. When adjustment has been effected through such examination the closure may then be restored to its original position by swinging the handle 196 upwardly which will restore the switch V to its original position to extinguish the lamps and close the shutter, whereupon the camera is in readiness for photocopying the print resting on the support beneath it.

It should be understood that the present disclosure is for the purpose of illustration only and that this invention includes all modifications and equivalents which fall within the scope of the appended claims.

I claim:

1. Apparatus for photocopying comprising a table for receiving a print, a camera mounted above the table for vertical movement to and from the table, said camera having at its lower side a lens and a shutter and at its upper side an exposure opening across which is disposed a length of unexposed film, a viewer screen including a ground glass in a side of the camera on which may be seen the print on the table, a shaft mounted above the screen opening, a closure having relatively movable parts mounted on the shaft for swinging movement, spring means operating to spread the closure parts apart at right angles to each other so that when unconstrained one occupies a plane covering the screen while the other would occupy a plane covering the film opening, a lug carried by the shaft normally holding the spring constrained with the one part covering the screen and the other part lying against it in an out-of-the-way position substantially parallel to the light path from the lens to the film exposure opening, said lug being angularly movable by rotation of the shaft to release the spring and allow it to move said other part into contact with the film opening without releasing the one part, and other means on the shaft operable following contact of said other part with the film opening to swing the one part away from the screen into contact with a fixed stop located at an angle of 45° with respect to the plane of the screen and means for holding the shaft at said position.

2. In a reflex camera having a lens shutter, a lens-image viewer, and a film to be exposed, viewer masking apparatus comprising a shaft rotatably mounted within the camera, a plate rotatably mounted on the shaft for masking the camera from light entering through the viewer, a plate rotatably mounted on the shaft for masking the film to be exposed from light within the camera, spring means for biasing the plates apart into masking positions, a lug carried by the shaft for normally engaging the film masking plate to hold said plates together in viewer masking position against said spring bias, said lug being angularly movable by rotation of the shaft to allow the spring to move the film masking plate into film masking position, and a lug carried by the shaft for subsequently rotating the viewer mask from viewer masking position to permit viewing of the lens image.

3. In a reflex camera having a lens shutter, a lens-image viewer, and a film to be exposed, masking and reflexing apparatus comprising a shaft rotatably mounted within the camera, a plate rotatably mounted on the shaft for masking the camera from light entering through the viewer, said plate having reflecting means on one side thereof, a plate rotatably mounted on the shaft for masking the film to be exposed from light within the camera, spring means mounted on the shaft for biasing the plates apart into masking positions, a lug carried by the shaft normally engaging the film masking plate to hold the plates together in viewer masking position against said spring bias, said lug being angularly movable by rotation of the shaft to allow the spring to move the film masking plate to film masking position, and a lug carried by the shaft for subsequently rotating the viewer masking plate from masking position whereby the reflecting side of said plate may reflect the lens image into the viewer.

References Cited in the file of this patent
UNITED STATES PATENTS

| | | |
|---|---|---|
| 816,907 | Garfield | Apr. 3, 1906 |
| 1,284,980 | Azzoni | Nov. 19, 1918 |
| 2,182,097 | Schenk | Dec. 5, 1939 |
| 2,230,251 | Jochum | Feb. 4, 1941 |
| 2,324,842 | Huebner | July 20, 1943 |
| 2,351,753 | Flint | June 20, 1944 |
| 2,356,880 | Pignone | Aug. 29, 1944 |
| 2,492,898 | Siekermann | Dec. 27, 1949 |
| 2,596,376 | De Goeij | May 13, 1952 |
| 2,629,813 | Murphy | Feb. 24, 1953 |
| 2,693,736 | Schumacher | Nov. 9, 1954 |
| 2,697,378 | Sexton | Dec. 21, 1954 |
| 2,704,484 | Schwesinger | Mar. 22, 1955 |
| 2,719,468 | Steiner | Oct. 4, 1955 |